(12) United States Patent
Li et al.

(10) Patent No.: US 12,353,434 B2
(45) Date of Patent: *Jul. 8, 2025

(54) DATA GUARD AT PDB (PLUGGABLE DATABASE) LEVEL

(71) Applicant: Oracle International Corporation, Redwood Shores, CA (US)

(72) Inventors: Yunrui Li, Fremont, CA (US); Giridhar Ravipati, Foster City, CA (US); Ian Neall, Henley-on-Thames (GB); Frank de Lange, Woerden (NL); Jing Zheng, Foster City, CA (US); Mahesh Girkar, Los Altos, CA (US); David Gagne, Goffstown, NH (US); Nitin Karkhanis, Nashua, NH (US); Sadhana Kyathappala, Westford, MA (US); Qingguang Cui, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,154

(22) Filed: Feb. 9, 2024

(65) Prior Publication Data
US 2024/0184803 A1 Jun. 6, 2024

Related U.S. Application Data

(63) Continuation of application No. 17/389,835, filed on Jul. 30, 2021, now Pat. No. 12,008,014.

(51) Int. Cl.
*G06F 16/27* (2019.01)
*G06F 11/14* (2006.01)
*G06F 16/23* (2019.01)

(52) U.S. Cl.
CPC .......... *G06F 16/27* (2019.01); *G06F 11/1471* (2013.01); *G06F 16/2358* (2019.01); *G06F 16/2365* (2019.01); *G06F 2201/82* (2013.01)

(58) Field of Classification Search
CPC ................. G06F 16/27; G06F 16/2358; G06F 16/2365; G06F 11/1471; G06F 2201/82
See application file for complete search history.

(56) References Cited

U.S. PATENT DOCUMENTS 7,464,113 B1 * 12/2008 Girkar ................... G06F 16/284
8,069,435 B1 * 11/2011 Lai .......................... H04L 67/51
717/106

(Continued)

FOREIGN PATENT DOCUMENTS

CN 109859068 A 6/2019

OTHER PUBLICATIONS

Oracle-Base.com, "Multitenant : PDB Refresh in Oracle Database 12c", Release 2 (12.2), https://oracle-base.com/articles/12c/multitenant-pdb-refresh-12cr2, dated Sep. 2016, 7 pages.

(Continued)

*Primary Examiner* — Mark E Hershley
(74) *Attorney, Agent, or Firm* — Hickman Becker Bingham Ledesma LLP; Brian Miller

(57) ABSTRACT

Herein is high availability for online transaction processing with redundancy and redo for a federation of pluggable databases and container databases. In an embodiment of a federation of container database management systems that includes a first container database, first redo data of a first pluggable database in a second container database is obtained based on a database dictionary in the first container database. To the first pluggable database in the first container database, the first redo data of the first pluggable database in the second container database is applied. Based on the (Continued)

database dictionary in the first container database, second redo data of a second pluggable database in a third container database is obtained. To the second pluggable database in the first container database, without modifying content of the first pluggable database in the first container database, the second redo data of the second pluggable database in the third container database is applied.

20 Claims, 7 Drawing Sheets

(56) References Cited

U.S. PATENT DOCUMENTS

| | | | | |
|---|---|---|---|---|
| 9,767,178 | B2* | 9/2017 | Srivastava | G06F 11/14 |
| 9,830,372 | B2* | 11/2017 | Rajamani | G06F 16/275 |
| 10,642,861 | B2* | 5/2020 | Srivastava | G06F 11/2038 |
| 10,698,771 | B2* | 6/2020 | Yang | G06F 11/2028 |
| 10,747,752 | B2* | 8/2020 | Krishnaswamy | G06F 16/2365 |
| 10,838,833 | B1* | 11/2020 | Jibaja | G06F 11/2094 |
| 10,917,358 | B1* | 2/2021 | Herle | H04L 47/828 |
| 10,990,464 | B1* | 4/2021 | Ping | G06F 3/0604 |
| 11,272,005 | B1* | 3/2022 | Blaszka | H04L 67/34 |
| 11,461,322 | B1* | 10/2022 | Plenderleith | G06F 16/2456 |
| 11,657,037 | B2* | 5/2023 | Krishnaswamy | G06F 16/275 707/703 |
| 11,860,743 | B1* | 1/2024 | Willett | G06F 9/45533 |
| 2008/0126846 | A1* | 5/2008 | Vivian | G06F 11/1482 714/E11.007 |
| 2012/0054546 | A1* | 3/2012 | Kampouris | G06F 11/0709 707/E17.007 |
| 2012/0323849 | A1* | 12/2012 | Garin, Jr. | G06F 16/27 707/E17.005 |
| 2013/0198133 | A1* | 8/2013 | Lee | G06F 16/00 707/611 |
| 2014/0164331 | A1* | 6/2014 | Li | G06F 3/065 707/648 |
| 2015/0120659 | A1* | 4/2015 | Srivastava | G06F 16/27 707/625 |
| 2015/0186064 | A1* | 7/2015 | Chen | G06F 3/0631 711/162 |
| 2015/0254240 | A1* | 9/2015 | Li | G06F 16/27 707/703 |
| 2015/0317212 | A1* | 11/2015 | Lee | G06F 11/1458 707/685 |
| 2016/0078068 | A1* | 3/2016 | Agrawal | G06F 16/215 707/692 |
| 2017/0109246 | A1* | 4/2017 | Chien | G06F 16/185 |
| 2017/0116249 | A1* | 4/2017 | Ravipati | G06F 16/13 |
| 2017/0116298 | A1* | 4/2017 | Ravipati | G06F 16/13 |
| 2017/0116435 | A1* | 4/2017 | Shanthaveerappa | G06F 16/21 |
| 2017/0220428 | A1* | 8/2017 | Li | G06F 16/00 |
| 2017/0220621 | A1* | 8/2017 | Colrain | G06F 11/0745 |
| 2017/0286517 | A1* | 10/2017 | Horowitz | G06F 11/0754 |
| 2017/0344592 | A1* | 11/2017 | Sundaram | G06F 16/273 |
| 2018/0121511 | A1* | 5/2018 | Li | G06F 16/2282 |
| 2018/0239677 | A1* | 8/2018 | Chen | G06F 11/203 |
| 2018/0268017 | A1* | 9/2018 | Parikh | G06F 16/2365 |
| 2019/0102421 | A1* | 4/2019 | Sonawane | G06F 11/2048 |
| 2019/0251191 | A1* | 8/2019 | Bedadala | G06V 40/168 |
| 2020/0026609 | A9* | 1/2020 | Rajamani | G06F 11/1471 |
| 2020/0097556 | A1* | 3/2020 | Chen | G06F 11/2094 |
| 2020/0104375 | A1* | 4/2020 | Earnesty, Jr. | G06F 16/214 |
| 2020/0125549 | A1* | 4/2020 | Hoang | G06F 16/2358 |
| 2020/0296026 | A1* | 9/2020 | Michael | H04L 45/12 |
| 2020/0394110 | A1* | 12/2020 | Ramohalli Gopala Rao | G06F 16/285 |
| 2021/0064420 | A1* | 3/2021 | Goudarzi | G06F 9/4881 |
| 2021/0241131 | A1* | 8/2021 | Khawas | G06F 16/214 |
| 2022/0191131 | A1* | 6/2022 | Gupta | H04L 43/10 |
| 2022/0382721 | A1* | 12/2022 | Muthukrishnan | H04L 67/1001 |
| 2022/0385459 | A1* | 12/2022 | Thomsen | H04L 9/0643 |
| 2023/0032790 | A1* | 2/2023 | Mahajan | G06F 9/45558 |

OTHER PUBLICATIONS

Oracle Database, "Oracle Multitenant: New Features In Oracle Database 18c", https://www.oracle.com/technetwork/database/multitenant/learn-more/multitenantwp18c-4396158.pdf, dated Mar. 2018, 19 pages.

* cited by examiner

DATA GUARD AT PDB (PLUGGABLE DATABASE) LEVEL

BENEFIT CLAIM AND RELATED CASES

This application claims the benefit as a continuation of application Ser. No. 17/389,835, filed Jul. 30, 2021, by Yunrui Li et al., the entire contents of which is hereby incorporated by reference. The applicant hereby rescinds any disclaimer of claim scope in the parent applications or the prosecution history thereof and advise the USPTO that the claims in this application may be broader than any claim in the parent application. Included herein in their entirety are the following related cases.
- U.S. Pat. No. 10,922,331 CLONING A PLUGGABLE DATABASE IN READ-WRITE MODE filed Jul. 20, 2016 by Giridhar Ravipati et al.
- U.S. Pat. No. 9,298,564 IN PLACE POINT-IN-TIME RECOVERY OF PLUGGABLE DATABASES filed Mar. 14, 2013 by J. William Lee et al.

FIELD OF THE INVENTION

The present invention relates to high availability for online transaction processing (OLTP). Herein are redundancy and redo techniques for a federation of pluggable databases and container databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Multitenant Architecture

A container DBMS is a powerful mechanism for database consolidation. A container DBMS provides a high degree of computer resource sharing while concurrently providing a high degree of isolation. A container DBMS is based on a "container". A container is a collection of schemas, objects, and related structures in a multitenant container database (CDB) that appears logically to an application as a separate database. Within a CDB, each container has a unique ID and name. The root database and every pluggable database (PDB) are each considered a separate container. A container DBMS may contain numerous PDBs. PDBs isolate data and operations so that from the perspective of a user or application, each PDB may appear as if it were a non-CDB. Each PDB is defined by its own separate database dictionary, defining database objects within the PDB. A user may access a PDB within a container DBMS by establishing a database session for a PDB.

A CDB enables computer resource amortization ("resource amortization"). The computer resources required to provision and host a PDB are in effect amortized between the multiple PDBs within a CDB. The computer resources needed per PDB are thereby reduced.

Database server system processes are not dedicated on a per PDB basis, but rather serve multiple PDBs within a CDB. The overhead of database server system processes is thereby amortized across the multiple PDBs in the CDB.

A container DBMS provides isolation, at least to a degree. Database sessions established for a PDB may be limited to accessing or otherwise viewing database objects defined for the PDB by the PDB's dedicated database dictionary.

A container DBMS may implement various levels of isolation. While database objects may be isolated between database sessions of different PDBs, various computing resources may be shared across the database sessions. Hosting multiple PDBs on the same database server thus allows the computing resources of database servers or instances to be shared between multiple PDBs.

Using a multitenant architecture, a server with a single operating system instance is used to run multiple CDBs and PDBs. By using a single operating system instance, resources in the operating system may be shared, including network resources such as a network stack. The network stack is a set of resources an operating system makes available to one or more processes spawned by the operating system. The set of resources include a private set of IP addresses, routing table, socket list, connection tracking table, firewall, network devices, and other network-related resources.

Failover

Multitenancy present operational complexity for high availability (HA) such as when a standby CDB synchronizes with a primary CDB or when the standby CDB becomes a new primary CDB. Existing approaches to HA multitenancy have the following design constraints that may restrict how synchronization and failover occur. While one CDB is operated as a primary, that CDB cannot receive redo records from other CDBs. A standby CDB can receive redo records from only one primary CDB. Thus, configuration of HA multitenancy according to HA roles, such as primary and standby, provides a rigid topology that may somewhat constrain reliability, availability, and serviceability (RAS) in ways that can impact concerns such as administration, capacity planning, vertical and horizontal scaling, elasticity, load balancing, and cascading multiple failures.

For example during peak hours, all online transaction processing (OLTP) demand may fall upon the primary CDB while the passive standby CDB may more or less idle. Conversely after hours, all of the reporting demand may fall upon the standby CDB while the primary CDB may more or less idle.

Especially problematic is that an entire CDB is the unit of synchronization and failover for multitenancy HA. For example, the primary CDB may contain multiple PDBs respectively have standby PDBs in the standby CDBMS. Because the primary CDB and the standby CDB have only one redo feed (i.e. stream or log file set) between them, all of the databases share the same redo feed, which may present a performance bottleneck. For example, it may be difficult or impossible to prioritize synchronization of one PDB over another PDB. Likewise, a synchronization spike for one PDB may cause starvation of synchronization for another PDB. Thus, replication lag may be unpredictable, which may violate a quality of service (QOS) for a tenant.

Even if only one PDB fails in the primary CDB, then the primary CDB and all of its PDBs must failover together to the standby CDB. Such monolithic failover may have various consequences. Monolithic failover maximizes the processing and input/output (I/O) loads. Such a spike may slow or break the failover or may impact unrelated container databases that share a same computer or local area network (LAN). Monolithic failover also means that client connections and database sessions should failover or be reestablished, which may stress a load balancer or break an ongoing transaction.

DETAILED DESCRIPTION

Figure 1:
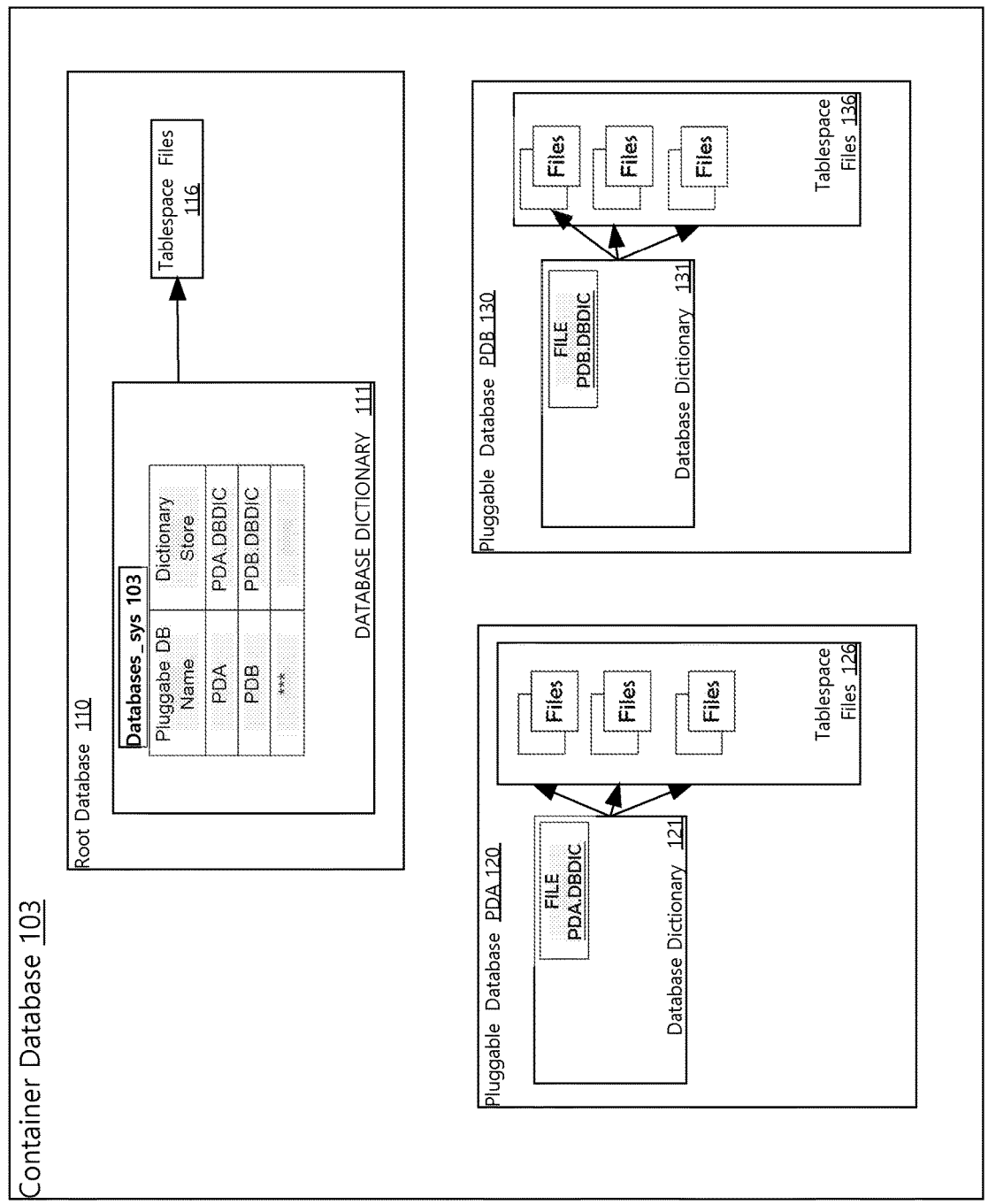
FIG. 1 is a block diagram that depicts an example container database in a database server.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

A topological hierarchy of container databases (CDBs) and pluggable databases (PDBs) presents various technical challenges for data replication for high availability (HA). As explained later herein, some database synchronization and HA techniques are somewhat restricted in scope to an entire CDB such that all of the PDBs in the CDB are always processed together based on a same network topology, even when only one or few of the PDBs currently require processing for HA.

Herein are finer grained HA techniques that support independent HA activity and configuration of individual PDBs such that the HA lifecycle, synchronization, and network topology of each PDB may be decoupled from those of other PDBs that share fully or partially overlapping respective sets of CDBs. Designation of HA roles such as primary and standby are shifted away from CDBs to PDBs for fine grained HA and unprecedented flexibility and spontancity in capacity planning for a data grid.

A new architecture for HA replication control data of PDBs is based on a so-called pseudo control file (PCF) that is stored in a database dictionary. A PCF facilitates replication and restoration of a PDB based on redo data. A PCF also maintains information about so-called lifespans of a PDB, which is a continuous tenure as a primary PDB in a particular CDB. The PCF tracks a series of lifespans of a PDB based on switchovers of a the PDB between a primary PDB and a standby PDB. A PDB switchover may be intended (i.e. planned) or unintended (i.e. failover).

Lifespan tracking may include PDB lifecycle events such as plugging and unplugging for migration or vertical scaling, cloning for increased redundancy or elastic horizontal scaling, and incarnations such as for restoration. A PCF may record a logical tree of versions of a PDB based on incarnations. Consultation of the replication control data in the PCF facilitates restoration of a multi-instance PDB from any point and to any point in the logical tree of versions, regardless of which and how many tree branches, lifespans, incarnations, and switchovers separate the two points in the logical tree.

Consultation of replication control data in a PCF facilitates real-time redo shipping and real-time redo apply regardless of topological arrangement of datacenters, networks, and CDBs in a synchronized federation. Interchangeability of redo and backups, regardless of topology and lifespans, is facilitated by consultation of the replication control data in the PCF. Although stored in a same database dictionary of a CDB, different types of PCFs may have different granularities of scope and different purposes. A variety of native database transactional isolation levels may protect contents of a PCF during concurrent use by different subsystems for different purposes. Synchronization of a PCF within a federation of CDBs and PDBs may be provided based on the type of PCF, and such synchronization may be expressed as part of a foreign redo feed.

1.0 Example Database Server

FIG. 1 illustrates an example structure for a general container database in a database server according to an embodiment. In FIG. 1, database server 100 represents a combination of software and resources on a computing device that is communicatively coupled to container database 103 and also to a database client via a communication network. An example of a computing device upon which database server 100 may be implemented is described below in the "Hardware Overview". In some embodiments, database server 100 is configured to accept user commands, such as queries, Data Definition Language (DDL), and Data Manipulation Language (DML) instructions, and carry out those commands on container database 103.

1.1 Example Container Database

Figure 2:
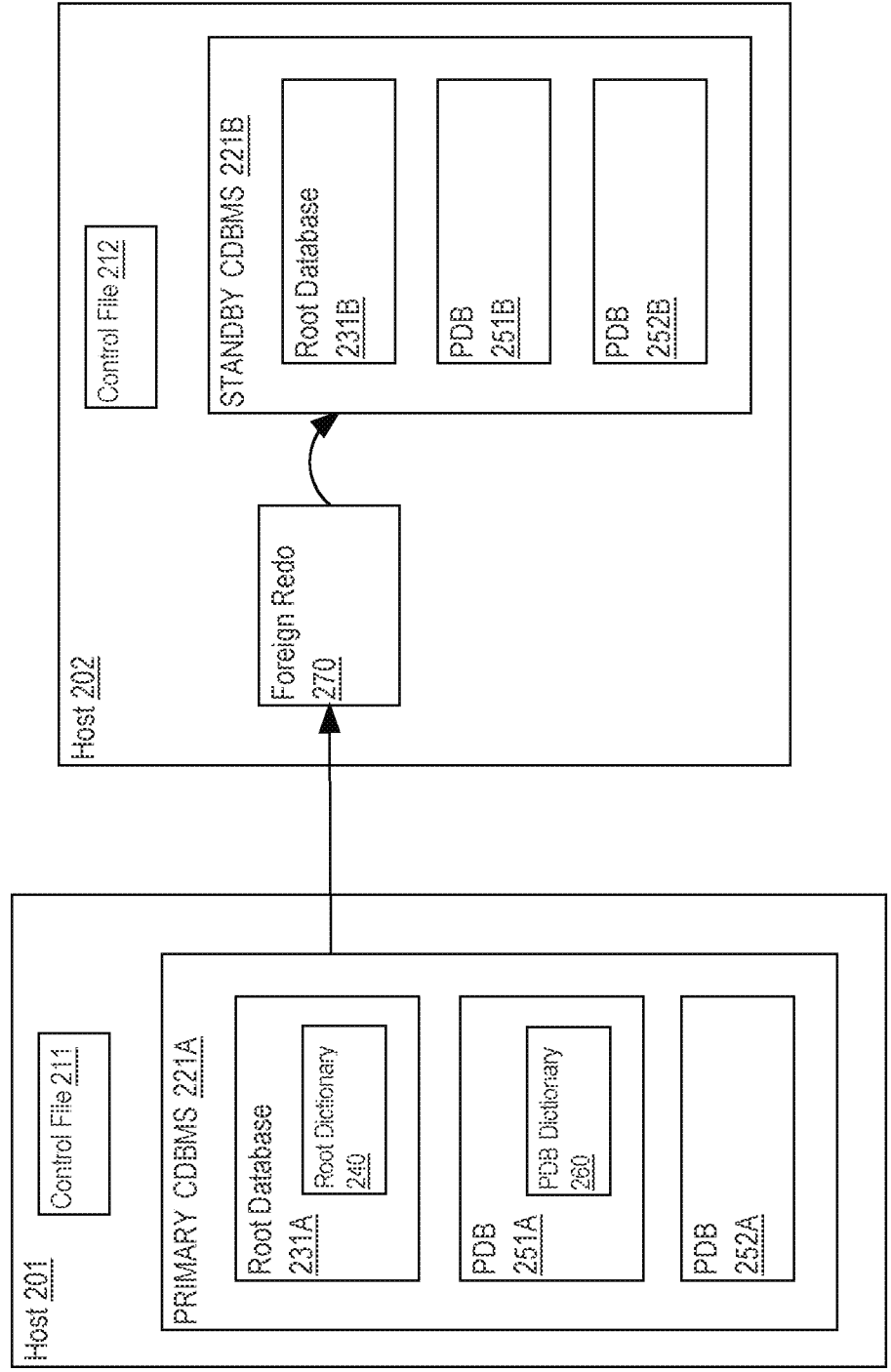
FIG. 2 is a block diagram that depicts an example high availability (HA) pair that provides buddy redundancy to avoid service outages of a container database and its pluggable databases.

Container database 103 contains multiple databases that are hosted and managed by database server 100. The databases include pluggable database PDA 120 and pluggable database PDB 130, and root database 110, which is associated with pluggable database PDA 120 and pluggable database PDB 130, as shall be explained in greater detail below. In other embodiments, the container database 103 may contain more pluggable databases than the number of pluggable databases that are depicted in FIG. 2. However, due to inherent hardware limitations, some implementations may set an upper limit on the number of pluggable databases that the container database 103 can support. Root database 110 is a database that is used by the database server 100 to globally manage container database 103, and to store metadata and/or data for "common database objects" that are accessible to users of the member PDBs.

Pluggable database PDA 120 includes database dictionary 121. Data for database objects of pluggable database PDA 120 is stored in tablespace files 126. Pluggable database PDB 130 includes database dictionary 131. Tablespace files 136 store data for database objects of pluggable database PDB 130.

The database server 100 responsible for the container database 103 may establish database sessions for the root database 110 or any of the member pluggable databases. The database dictionary of the PDB for which the database session is established determines the scope of the commands issued by a database client, which is which database(s) the command will be executed on, which permissions are checked, which database dictionaries will be used for the session, and so forth.

1.2 Example Root Database

Root database 110 is a database used by database server 100 to globally manage the container database 103. An important function facilitated by root database 110 is to define pluggable databases within the container database 103. Similar to pluggable databases, the root database 110 includes a database dictionary 111. The database dictionary of a root database may be referred to herein as a root database dictionary. Database dictionary 111 contains metadata that defines various aspects of the container database 103 needed to administer container database 103 and the pluggable databases contained therein. Data for database objects defined by database dictionary 111 is stored in tablespace files 116.

Database dictionary 111 defines pluggable databases within the container database 103 as well as aspects or properties of a pluggable database. The attribute Pluggable DB is a name or label for a pluggable database.

1.3 Example Pluggable Database Session

A user may access a PDB in Container Database 103 by submitting a connection request that identifies the PDB. In response to receiving the request, database server 100 establishes a database session for the PDB. Establishing the database session for the PDB entails establishing the database dictionary of the PDB as the database dictionary for the database session. Once the PDB dictionary is established as a database dictionary of the PDB, access is isolated to the database objects of the PDB, and to common database objects of the root database, as shall be described in further detail. Establishing the PDB dictionary as a database dictionary for a database session may be referred to herein as attaching the database dictionary to the database session. More information about establishing database sessions in response to connection requests can be found, for example, in U.S. Pat. No. 8,713,186, the entire contents of which are incorporated herein.

With respect to the PDB objects in the one or more PDBs of a container database, execution of database commands issued to a database session attached to a PDB dictionary can only access PDB objects that are defined by the PDB dictionary. Consequently, access by users of the database session may be restricted to accessing PDB objects that are defined by the attached PDB dictionary, thereby isolating database access to PDB objects to those in the respective PDB. This isolation not only applies to end users but may also apply to administrators of a PDB.

For example, in response to a connection request for access to Pluggable Database PDA 120, Database Dictionary 121 is attached to the database session. Database commands issued in the database session are executed against Database Dictionary 121. Access to pluggable database objects through Data Manipulation Language (DML) and Data Definition Language (DDL) commands issued in the database session is isolated to pluggable database objects defined by Database Dictionary 121. Isolation by concurrently executing database sessions with Pluggable Database PDA 120 or Pluggable Database PDB 130 is achieved in the same manner.

2.0 Example High Availability Pair

FIG. 2 is a block diagram that depicts an example high availability (HA) pair 200, in an embodiment. HA pair 200 provides buddy redundancy to avoid service outages of a container database and its pluggable databases. FIG. 2 is discussed with reference to FIG. 1 that has only one container database and one of each pluggable database, any of which may be a single point of failure that causes a service outage. HA pair 200 instead has two of each database as a primary database and a standby database that are synchronized mirrors of each other with identical content so that no individual database instance can be a single point of failure to cause a service outage.

Each of container database management systems (CDBMSs) 221A-B may be an implementation of database server 100 and container database 103. CDBMSs 221A-B respectively reside on hosts 201-202 that may be computers connected by a communication network such as a local area network (LAN) or an internetwork. For example, hosts 201-202 may reside in a same or different datacenters.

Although CDBMSs 221A-B are replicas of each other, they have separate respective roles and thus behave differently. Primary CDBMS 221A is active and can directly execute data modifications such as transactions and DML writes. Standby CDBMS 221B instead is passive and its data typically is only modified as changes are synchronized from primary CDBMS 221A to standby CDBMS 221B. Such synchronization may occur by standby CDBMS 221B applying redo records that describe data modifications that occurred on primary CDBMS 221A.

In an embodiment, primary CDBMS 221A generates redo records in batches and provides each batch as a redo log file for standby CDBMS 221B to apply. For example, CDBMSs 221A-B may share a cross-mounted filesystem. In an embodiment, primary CDBMS 221A instead streams redo records directly to standby CDBMS 221B through a network connection. In some scenarios a CDBMS may apply redo records that it had itself previously generated. As shown, foreign redo 270 contains redo records that instead are generated by primary CDBMS 221A and sent to standby CDBMS 221B to be applied for synchronization.

HA pair 200 has the following design constraints that may restrict how synchronization and high availability occur. While CDBMS 221A operates as primary, it cannot accept redo records from other CDBMSs. Standby CDBMS 221B can accept redo records from only one primary CDBMS. Thus, configuration of an HA pair according to HA roles provides a rigid topology that may somewhat constrain reliability, availability, and serviceability (RAS) in ways that can impact concerns such as administration, capacity planning, vertical and horizontal scaling, elasticity, load balancing, and cascading multiple failures.

For example during peak hours, all of the online transaction processing (OLTP) demand may fall upon primary CDBMS 221A while passive standby CDBMS 221B may more or less idle. Conversely after hours, all of the reporting demand may fall upon standby CDBMS 221B while primary CDBMS 221A may more or less idle.

Especially problematic is that an entire container database is the unit of synchronization and failover in HA pair 200. For example, primary CDBMS 221A contains multiple PDBs 251A and 252A that respectively have PDBs 251B and 252B as standbys in standby CDBMS 221B. In other words, CDBMSs 221A-B have separate instances of a same container database. Likewise, PDBs 251A-B are separate instances of a same pluggable database.

Because HA pair 200 has only one redo feed (i.e. stream or log file set), all of the databases in HA pair 200 share the same redo feed, which may present a performance bottleneck. For example, it may be difficult or impossible to prioritize synchronization of PDB 251 over 252. Likewise, a synchronization spike for PDB 251 may cause starvation of synchronization for PDB 252. Thus, replication lag may be unpredictable, which may violate a quality of service (QOS).

Even if only one PDB fails in primary CDBMS 221A, then primary CDBMS 221A and all of its PDBs must failover together to standby CDBMS 221B. Such monolithic failover may have various consequences. Monolithic failover maximizes the processing and input/output (I/O) loads. Such a spike may slow or break the failover or may impact unrelated container databases that share a same computer or LAN. Monolithic failover also means that client connections and database sessions should failover or be reestablished, which may stress a load balancer or break an ongoing transaction.

Other HA aspects of HA pair 200 are as follows. Root database 231A and its root dictionary 240 are synchronized to root database 231B through the shared redo feed of container database 221. Thus, replication control data and data share a redo feed. Likewise, PDB 251A and its PDB dictionary 260 are synchronized to PDB 251B through the shared redo feed. Thus, schematic changes may be automatically synchronized.

However, some replication control data is necessarily different between CDBMSs 221A-B and should not be synchronized. Such distinct replication control data is instead stored in respective control files 211-212 that are data files in the filesystems of hosts 201-202. Each control file may track multiple redo log files for each of CDBMSs 221A-B. For example if the redo feed is a network stream, then persistence of the redo feed may be provided by respective sets of redo log files in a shared or separate respective filesystems of CDBMSs 221A-B.

Contents of both sets of redo log files may somewhat differ because primary CDBMS 221A may log some unsent changes that standby CDBMS 221B has not yet received. Thus, both sets of redo log files contain actually separate sets of files that may have different file paths, filenames, and sequence ranges, which is an example of why control files 211-212 are different from each other in content although possibly identical in structure.

3.0 Example CDBMS Federation

Figure 3:
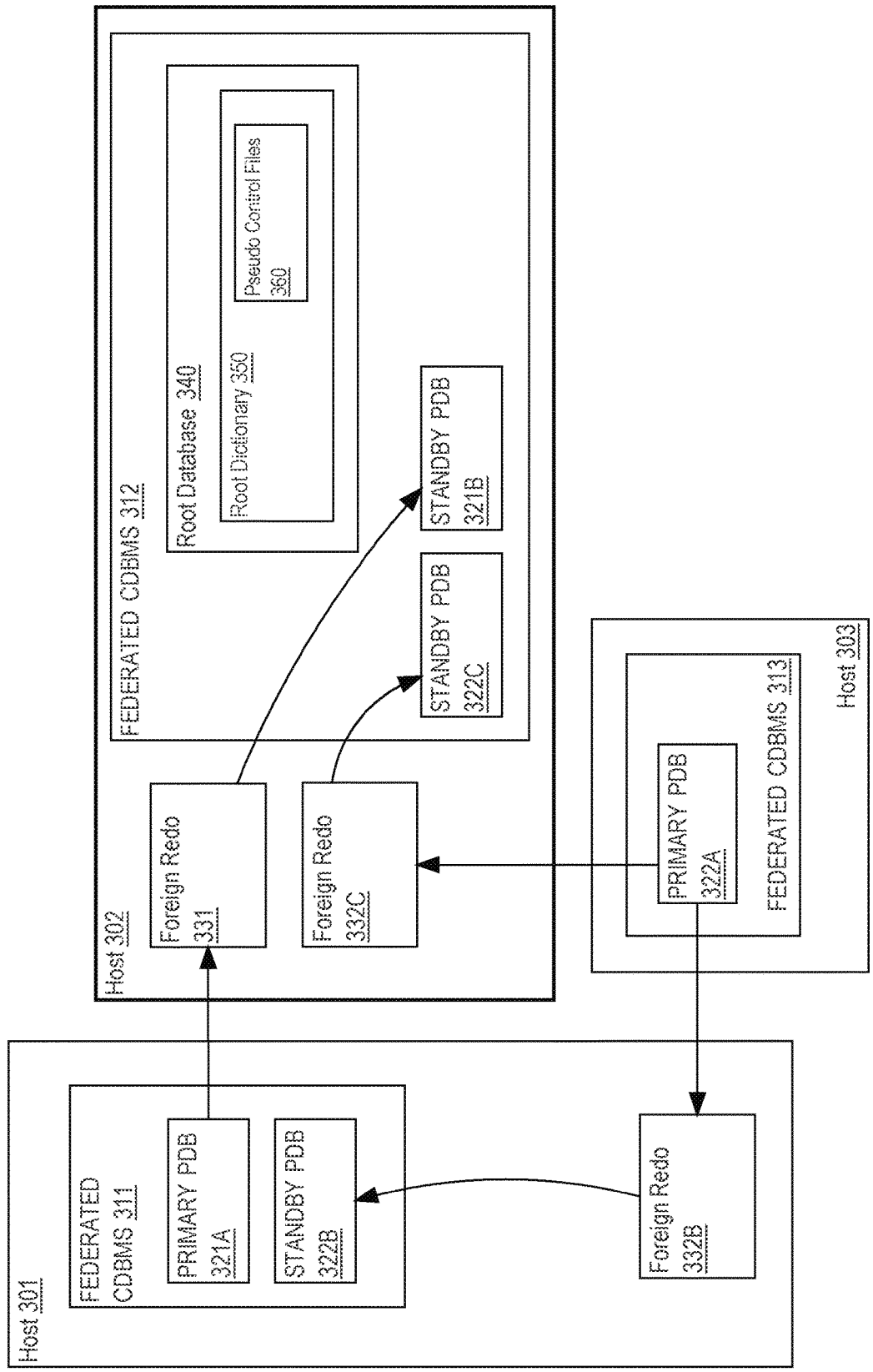
FIG. 3 is a block diagram that depicts an example federation that implements redundancy and redo techniques, for pluggable databases in the federation, that provide high availability for online transaction processing (OLTP)

FIG. 3 is a block diagram that depicts an example federation 300, in an embodiment. FIG. 3 demonstrates redundancy and redo techniques, for pluggable databases in federation 300, that provide high availability for online transaction processing (OLTP). Federation 300 overcomes the design constraints that restrict how synchronization and high availability occur for HA pair 200 as discussed earlier herein.

3.1 a Known Unfederated Approach

The increased flexibility of federation 300 provides increased reliability, availability, and serviceability (RAS) in ways that achieve improved results for concerns such as administration, capacity planning, vertical and horizontal scaling, elasticity, load balancing, and resilience for cascading multiple failures. Such flexibility would be more or less practically impossible using other approaches to dynamically propagate foreign modifications between so-called refreshable PDB clones as discussed in the PREPARING A PDB CLONE FOR REFRESH section of related U.S. Pat. No. 10,922,331.

As explained earlier herein, control files 211-212 in HA pair 200 are unsynchronized. Likewise, some replication control data coherency between many refreshable PDB clones is not automated and cannot occur in real time, which imposes the following disadvantages.

A refreshable clone does not bookkeep standby redo log (SRL) metadata, which prevents live redo shipping. Without live redo shipping, a refreshable clone has no real time apply of redo.

A refreshable clone does not bookkeep archive log information. Thus, refreshable recovery of a PDB needs to communicate with either a source CDBMS or a centralized catalog database to discover where are PDB archive logs.

A refreshable clone is typically configured to perform refreshable recovery every five minutes. When refreshable recovery starts, a source CDBMS is contacted to discover a recovery end system change number (SCN). The source CDBMS ensures that all redo from the last prior refresh up to the target end SCN are archived to archive logs in some shared storage location. If some redo records are still in the current online redo log, those redo records will be archived to a partial archive log. After that, refreshable recovery recovers to the end SCN using those archive logs. There are different variations with similar effect, such as retrieving contents of those archive logs during recovery.

A refreshable clone cannot be instantiated from an arbitrary backup because old backups may contain information (e.g. belong to an earlier database incarnation) that refreshable recovery cannot handle due to lack of persistent tracking of incarnations. Incarnations are discussed later herein.

A refreshable clone cannot restore from a backup that was made on the source PDB from which the clone PDB was cloned. It is also impossible to make a backup directly from a refreshable clone. The datafiles on a refreshable clone contain an incompatible admixture of half-foreign (e.g. use foreign SCN) and half-local sets of SCNs.

Even if the process of making such a backup somehow were able to repair the backup header to make it be completely foreign, due to the way refresh recovery handles recovery markers, the result of the backup might not be accepted as a valid backup of the source PDB. Because of this, Oracle recovery manager (RMAN) is designed to never take a backup from a refreshable clone. If an attempted refreshable recovery encountered a corruption, it cannot be fixed by restoring from full backup and/or applying incremental backup(s) without a significant redesign of the logics of refresh and backup.

Furthermore, refreshable recovery would be unable to handle all redo operation codes (opcodes) such as alter tablespace read write, which are simply disallowed on the source PDB. After one refreshable clone becomes a new primary during failover, other refreshable clones must be re-instantiated, even if they were behind in recovery. This problem of so-called bystander PDBs observing role transitions by other instances of the same PDB is discussed later herein.

3.2 a Novel Federated Approach

As explained above and earlier herein, architectures such as refreshable clones and HA pair 200 provide important mechanisms that can assist with high availability and can be used as components for some aspects of federation 300. However, refreshable clones and HA pair 200 essentially are evolutionary predecessors of the design of federation 300. The following design goals and architectural improvements depart from refreshable clones and HA pair 200 in the following substantial ways.

Unlike HA pair 200 that has a static topology of two container databases, the topology of federation 300 is dynamic to accommodate topological migration and role transitions of participating instances of a PDB and elastic inclusion of additional standby databases. In other words, the topology of federation 300 need not be static, which the following improved architectural mechanisms facilitate.

3.3 Topological Flexibilities

A federated CDBMS in federation 300 need not be assigned a particular HA role. For example federated CDBMSs 311-313 may be peers that may be somewhat arbitrarily interrelated such as in a ring topology or a more or less fully interconnected topology.

For example, federated CDBMS 311 may contain a mix of primary PDBs and standby PDBs for other CDBs, such as with primary PDB 321A and standby PDB 322B as shown. Thus, federated CDBMS 311 may send redo records to some federated CDBMS(s) and receive redo records from other federated CDBMS(s), such as sending foreign redo 331 to federated CDBMS 312 and receiving foreign redo 332B from federated CDBMS 313 as shown.

For a same PDB, a federated CDBMS may (e.g. concurrently) send the same redo records to multiple federated CDBMSs that each contains a respective instance of the same PDB. For example as shown, from primary PDB 322A, federated CDBMS 313 sends respective foreign redo 332B-C in separate respective redo feeds to respective federated CDBMSs 311-312 to be (e.g. concurrently) applied to respective standby PDBs 322B-C. Thus, a multi-instance PDB may have more standby PDBs than primary PDBs, which provides increased tolerance for cascading multiple failures of a same PDB.

Herein, a multi-instance PDB is one primary PDB and one or more standby PDBs. Each PDB instance of a multi-instance PDB resides in a different respecting CDBMS. However herein, each PDB instance is structurally an independent PDB with separately stored contents. Other multi-instance approaches are not federated and are instead based on shared persistent storage, which may have disadvantages such as: a) a persistent storage bandwidth bottleneck and/or single point of failure, b) a bias toward shared persistent storage based on proprietary hardware, and/or c) a bias toward collocation in a network topology.

Each standby PDB in a same federated CDBMS may receive foreign redo from a different respective federated CDBMS. For example as shown in federated CDBMS 312, each of standby PDBs 321B and 322C receive foreign redo from respective federated CDBMSs 311 and 313 based on respective primary PDBs 321A and 322A.

3.4 Aggregation of Fine Grained Redo Feeds

Although not shown, a first federated CDBMS may contain two standby PDBs that both receive respective foreign redo from a same second federated CDBMS that contains two respective primary PDBs. In various embodiments, the two PDBs have two separate respective redo feeds or, instead, share the same single combined redo feed. Because the first and second federated CDBMSs do not have HA roles, the first and second CDBMSs themselves and their root databases are, in various embodiments: a) not synchronized, b) synchronized by separate redo feeds, or c) synchronized in the same combined redo feed as the PDBs.

For example in an embodiment, no matter how many PDBs do federated CDBMSs 311-312 contain, federation 300 may be fully synchronized with only three redo feeds, which is one redo feed per distinct pairing of federated CDBMSs. Thus, synchronization overhead is minimized. In an embodiment, a single gap fill request specifying a single range of redo records can retrieve redo records for multiple PDBs. Gap detection and filling are discussed later herein.

A redo feed may be transported through a network connection such as for live redo shipping for real time apply of received redo as discussed later herein. When a redo feed is shared by two distinct PDBs that are both hosted in a same two federated CDBMSs, the combined redo feed may share a single network connection between those two federated CDBMSs. Thus, network transport control overhead is minimized.

3.5 Topological Opportunism

Although not shown, a federated CDBMS may contain two primary PDBs whose respective standby PDBs are in different respective federated CDBMSs. In the above ways, the topology of federation 300 may distribute and/or collocate primaries and standbys of various PDBs in various ways in the federated CDBMSs in federation 300. This provides administrative freedom to clone or relocate PDBs in an opportunistic way that need not be based on capacity planning that occurs in advance and/or that pessimistically overprovisions hardware.

For example, intelligent automation such as a rules engine or machine learning may opportunistically reconfigure federation 300 based on scheduled or unscheduled operating conditions such as infrastructure maintenance of software or hardware, predictable or unpredictable elastic demand, peak hours and off hours, sudden failures, changes of service level agreements (SLAs), onboarding of new customers, and rollout or decommissioning of applications. Automation for reconfiguring federation 300 is presented in U.S. patent application Ser. Nos. 16/055,468 and 16/135,769, the entire contents of which are incorporated herein.

For example, standby PDBs and primary PDBs may horizontally or vertically upscale or downscale somewhat independently. For example during peak hours, a primary PDB may vertically upscale by moving to a federated CDBMS that can provide more computer resources such as central processing units (CPUs), volatile memory, or network bandwidth. During after-hours scheduled reporting or analytics, standby PDBs may horizontally upscale by cloning. For example, standby PDBs might not support OLTP and instead support read-only queries such as for online analytical processing (OLAP). Because scaling is elastic in federation 300, upscaling may be followed by downscaling to return to baseline provisioning when operating conditions revert to normal.

3.6 Metadata for High Availability

Federation 300 has a novel architecture for replication control data that tracks the current and historical states of the topology, HA roles, and incarnations in federation 300. Agility of federation 300 includes synchronization and full tracking of such replication control data, which is provided by pseudo control files that are replicated into the root dictionary in the root database of each of federated CDBMSs 311-313. For example as shown, pseudo control files 360 are stored in root dictionary 350 in root database 340 in federated CDBMS 312.

Each PDB in a same federated CDBMS has its own pseudo control file in the root dictionary of the root database in that federated CDBMS. For example, pseudo control files 360 contains a respective pseudo control file for each of standby PDBs 321B and 322C.

4.0 Example Pseudo Control Files

Figure 4:
FIG. 4 is a block diagram that depicts example pseudo control files that have different respective purposes, store different replication control data, and have different numerosity even though they reside in a same root database dictionary of a federated container database management system (CDBMS)

FIG. 4 is a block diagram that depicts example pseudo control files 401-402, in an embodiment. Pseudo control files 401-402 have different respective purposes, store different replication control data, and have different numerosity even though they reside in a same root database dictionary of a federated CDBMS. There is one pseudo control file 402 in each federated CDBMS. There is one pseudo control file 401 for each PDB in a given federated CDBMS.

4.1 Example Life History Table

Pseudo control file 401 stores replication control data that tracks the current and historical states of the topology, HA roles, and incarnations for PDB 322. Because there are instances of PDB 322 in federated CDBMSs 311-313, the root dictionary in the root database of each of those federated CDBMSs contains a synchronized copy of pseudo control file 401. For example, pseudo control files 360 contains pseudo control file 401 in an embodiment.

Pseudo control file 401 contains life history table 410 that tracks the current and historic state of PDB 322 with regards to membership in federation 300. Life history table 410 and pseudo control file 401 are stored in a root database dictionary that stores a separate pseudo control file for each PDB that the federated CDBMS contains. Thus, there is a respective life history table for each PDB that the federated CDBMS contains. In a preferred embodiment, pseudo control file 401 is divided into two pseudo control files that track the life histories of CDBMSs and PDBs respectively.

Life history table 410 is synchronized such that each federated CDBMS that contains PDB 322 has an identical replica of life history table 410. In various embodiments, life history table 410 is or is not implemented as a relational table. For example, the rows of history table 410 may be stored with other metadata rows in a same relational table.

Life history table 410 consists of rows and columns. The rows of life history table 410 are expressly shown in the system change number column. Other columns are demonstratively shown with seemingly fewer rows that correspond to one or more rows of the system change number column. That is simplified drawing to indicate that a value in a given row of a column is actually repeated in multiple adjacent unshown rows that directly correspond to the rows in the system change number column. In other words, a column other than the system change number column shows rows only when values in the column change. For example, the value of two as shown in one row of the incarnation column actually occurs in two adjacent rows of the incarnation column that correspond to two shown rows in the system change number column.

The demonstrative vertical arrow indicates that the rows of life history table 410 were inserted in a temporal sequence that tracks, in real time, the evolving membership of PDB 322 in federation 300. For example, the top row is the oldest row and represents the oldest membership state of PDB 322. Rows are inserted at the bottom of life history table 410, and the bottom row represents the current membership state of PDB 322. For example as shown in the primary column, PDB 322A in CDMS 313 is the current primary for PDB 322, also as shown in FIG. 3.

4.2 Lifespans

Each shown row in the primary column represents a separate lifespan of PDB 322. A lifespan is an uninterrupted duration in which a same PDB in a same federated CDBMS is the primary for PDB 322. Thus, a planned switchover such as for administration or an unplanned switchover (i.e. failover) of PDB 322 terminates the previous lifespan and initiates a new next lifespan. The next lifespan has a different primary for PDB 322 than the previous lifespan. Implications of lifespans are discussed later herein.

Unlike HA pair 200 that has monolithic switchover in which all PDBs in HA pair 200 switchover together even if only one PDB failed, switchover in federation 300 may instead occur on a per PDB basis, even if multiple PDBs share a same federated CDBMS. For example, PDB 321 may switchover while PDB 322 does not.

4.3 Horizontal Scaling and Backwards Compatibility of Content

Each row in the primary column designates only one PDB as primary, unless PDB 322 has a multi-instance primary, which is not shown. The last row of the standbys column indicates a multi-instance standby as shown in FIGS. 3-4. As shown in the second row of the standbys column, PDB 322 may sometimes have no standbys. In a preferred embodiment, the standbys column is stored in a different pseudo control file (not shown) than pseudo control file 401.

Although not shown in FIGS. 3-4, federation 300 may contain some PDBs and/or CDBMSs that are not configured for federated synchronization. For example, the PDBs and CDBMSs in HA pair 200 of FIG. 2 are not configured for federating but may nonetheless be hosted in federation 300.

4.4 Incarnations and PDB Restore

The system change number (SCN) column tracks ranges of system change numbers. Each set of data changes (e.g. one or more transactions) applied at a same time to the primary for PDB 322 is assigned a unique and monotonically increasing SCN. In various embodiments, SCNs are implemented as timestamps or integer serial numbers. In various embodiments: a) federation 300 has only one sequence of globally unique SCNs, b) each CDBMS has its own independent sequence of SCNs that all of its PDBs share, or c) each PDB has its own SCN sequence that all of its PDB instances share.

With some exceptions, the system change number ranges increase monotonically as shown. In other words, SCN values generally are not reused. An exception is database restoration from a historical backup, which causes the SCN sequence of the restored PDB to be reset to the most recent (i.e. highest) SCN value in the backup, such as shown in the last row of the SCN column.

Thus, SCN values may sometimes be reused, which life history table 410 disambiguates with the incarnation numbers stored in the incarnation column that never stores duplicate values. Restoration from a backup of a different incarnation or change between lifespans (i.e. switchover) always causes a new incarnation of the PDB. For example, a PDB may have a logical tree of versions, where each branch of the version tree is a distinct incarnation.

As discussed earlier herein, HA pair 200 has architectural and metadata limitations that impose administrative and topological constraints that federation 300 avoids such as facilitated by pseudo control files and other mechanisms described herein. The additional flexibilities of federation 300 are also integrated into restoration from backup as follows.

A full or incremental PDB backup may be generated by a primary PDB and later used (i.e. for restoration) by a standby PDB, or vice versa. A PDB backup may be generated in one CDBMS or lifespan and used in a different CDBMS or lifespan. Upon restoration, a new incarnation number is automatically generated and tracked in life history table 410 and automatically synchronized between all instances of the PDB. In an embodiment, the new incarnation number is detectable in a redo feed and may cause updating a life history table of a standby PDB.

4.6 Example Log Files Metadata

Pseudo control file 402 contains log files metadata 430 that specifies, for federated CDBMS 311, redo log files that may be exchanged with foreign federated CDBMSs. Although each federated CDBMS has its own pseudo control file 402, these pseudo control files are unsynchronized and may contain replication control data that is local to one federated CDBMS.

A PDB in CDBMS 311 does not have its own separate set of redo log files that contain redo records that have been or will be applied to the contents of the PDB. Instead and regardless of which and how many PDBs are involved, redo records sent in a same redo feed from a same sender CDBMS to a same receiver CDBMS are stored together in a same set of redo log files. Thus, a same redo log file may contain redo records that were or will be applied to different PDBs in the same receiver CDBMS. For example and although not shown, the sender CDBMS may contain multiple primary PDBs of which at least two of those primary PDBs have standby PDBs in a same receiver CDBMS. Thus, the receiver CDBMS receives a redo feed that commingles redo records that came from both primary PDBs. For example with that redo feed, detection and filling of a single gap may involve resending redo records that came from both primary PDBs.

Likewise, restoration of one PDB may entail applying redo records to that PDB that are retrieved from a redo log file that interleaves redo records of multiple PDBs. For example, a logically contiguous series of redo records for that PDB might not be actually contiguous in the redo log file due to interleaving of redo records of other PDBs. For example, restoration of only that PDB may entail skipping (i.e. not applying) interleaved redo records of other PDBs from a same redo log file. Thus, processing a redo record from a commingled redo feed may entail: a) inspecting the redo record to detect which PDB does the redo record regard, and/or b) deciding whether to apply or to skip (i.e. not apply) the redo record based on which PDB does the redo record regard. For example, reading multiple redo records from a redo log file as part of restoring a PDB or receiving multiple redo records that were resent to fill a gap may entail applying some redo records and ignoring other redo records that are interleaved.

Each row of log files metadata 430 represents a separate log file whose respective location in a filesystem is stored in the path column. The CDBMS column stores an identifier of a foreign federated CDBMS that either sends redo records to federated CDBMS 311 or receives redo records from federated CDBMS 311. The sequence number column stores a range of serial numbers that identify a sequence of redo records. Between two federated CDBMSs, a redo feed may have multiple log files as shown in the top two rows of log files metadata 430. Federated CDBMS 311 may consult life history table 410 and/or log files metadata 430 when: a) establishing a network connection for a redo feed, b) sending or receiving redo records, and/or c) detecting or filling a gap in the redo feed. In an embodiment, log files metadata 430 contains indications of whether each log file is active or archived.

4.7 Exemplary Embodiments

The additional flexibilities of federation 300 are integrated into synchronization of redo to provide the following benefits. Synchronization, switchover, and restoration are all activities that may entail applying foreign redo. A PDB that has two standbys has two surviving instances when the primary PDB fails. One of the surviving standbys performs an HA role change to become the primary PDB in a new next lifespan of the PDB.

The other surviving PDB is a bystander that observes the failover but remains a standby PDB in the new lifespan. As part of the failover, the surviving PDB may apply foreign redo from the failed previous primary for the PDB. The bystander PDB may subsequently apply foreign redo from the new primary PDB for transactions that finish after the failover. In any case, a switchover entails updating and/or synchronizing at least pseudo control file 401 in all survivors of a PDB.

A sequence of lifespans of a PDB may have at least two lifespans after a given lifespan, such as when a sequence of switchovers causes a respective surviving instance of the PDB to become a primary PDB in two different federated CDBMSs at two different respective times. Subsequently, the PDB may be restored to a point in time by using a backup of the given lifespan, which is multiple lifespans in the past. As taught in related U.S. Pat. No. 9,298,564, restoration to a point in time may entail applying redo that was generated somewhat near the time that the backup was generated. By consulting pseudo control files such as 401-402 and applying old (e.g. archived) foreign redo data, the PDB may be restored to a point in time.

In an embodiment, synchronization and restoration may entail concurrent tasks that race to read or write replication control data in a same pseudo control file. Different kinds of tasks may need different transactional isolation levels for the pseudo control file. For example, multiple concurrently racing redo synchronization tasks may need SERIALIZABLE isolation, but a restoration task may need only READ COMMITTED isolation. Thus, two tasks may have different respective transactional isolation levels for simultaneously accessing a same pseudo control file.

5.0 Example Process for Independent Redo Synchronization of Collocated PDBS

Figure 5:
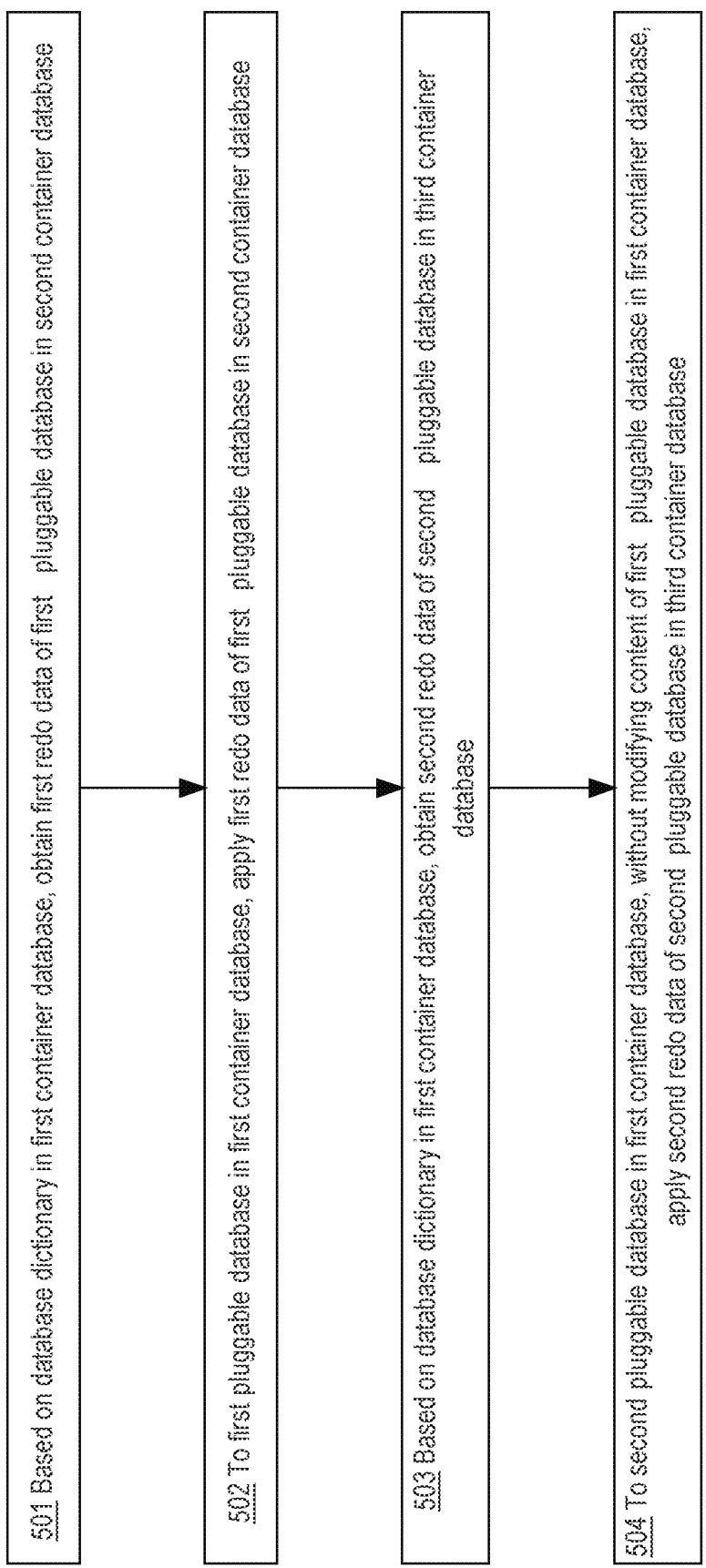
FIG. 5 is a flow diagram that depicts a federated CDBMS performing an example computer process that independently synchronizes standby PDBs by applying respective foreign redo from respective foreign CDBMs.

FIG. 5 is a flow diagram that depicts federated CDBMS 312 performing an example computer process that independently synchronizes standby PDBs 321B and 322C by applying foreign redo 331 and 332C from respective foreign CDBMs. In various scenarios, respective synchronization of standby PDBs 321B and 322C respectively occurs during any of: ongoing synchronization, switchover, or restoration. FIG. 5 is discussed with reference to FIGS. 3-4.

Based on root dictionary 350 in root database 340 in the container database of federated CDBMS 312, step 501 obtains foreign redo 331 from primary PDB 321A in the container database of federated CDBMS 311. Examples of redo shipment are discussed earlier herein.

In one example, step 501 consults the primary column of the last row in a life history table to identify primary PDB 321A in federated CDBMS 311 as a source of a redo feed for synchronizing standby PDB 321B. Step 501 consults the CDBMS column and redo transport metadata (not shown) to establish a network connection to receive foreign redo 331.

Step 501 may also consult the CDBMS column and a log files metadata structure to detect which one or more rows in the log files metadata structure represent log file(s) that correspond to federated CDBMS 311 for PDB 321. The sequence number in the redo transport metadata may be fit into a range of sequence numbers in the log files metadata to selected one row of the log files metadata that represents whichever of multiple log files is the latest for PDB 321. The sequence number may also be used for gap detection and filling.

When received, foreign redo may be appended onto the selected log file and/or retained in an I/O buffer in volatile memory of federated CDBMS 312. In an embodiment, foreign redo 331 is instead received as a file in a filesystem that is or is not cross-mounted with federated CDBMS 311.

To standby PDB 321B in the container database of federated CDBMS 312, step 502 applies foreign redo 331 of primary PDB 321A. For example, foreign redo 331 may be read from the selected log file or read directly from a same I/O buffer as used to receive foreign redo 331 from the network connection. Examples of applying redo are discussed earlier herein. Techniques for applying redo are presented in related U.S. Pat. No. 10,922,331.

Steps 503-504 demonstrate independent synchronization of another PDB in same federated CDBMS 312 even though a different foreign CDBMS is involved than in steps 501-502. Steps 503-504 operate in more or less the same way as respective steps 501-502 as explained above. However, because a different PDB and a different foreign CDBMS are involved, step 503 may differ from step 501 as to which pseudo control file, metadata, and/or row(s) within same metadata are accessed.

Based on root dictionary 350 in root database 340 in the container database of federated CDBMS 312, step 503 obtains foreign redo 332C from primary PDB 322A in the container database of federated CDBMS 313. Step 503 differs from step 501 by obtaining different foreign redo of a different PDB from a different federated CDBMS.

To standby PDB 322C in the container database of federated CDBMS 312, step 504 applies foreign redo 332C of primary PDB 322A. Step 504 affects PDB 322 without modifying content in PDB 321 nor otherwise affecting PDB 321, and vice versa in step 502. Thus, the process of FIG. 5 demonstrates independent synchronization of PDBs dispersed throughout federation 300.

In an embodiment, steps 501-502 for PDB 321 occur concurrently to steps 503-504 for PDB 322. In an embodiment, steps 501-502 use a different network connection for synchronization of PDB 321 than steps 503-504 use for PDB 322, especially because the respective redo feeds for PDBs 321-322 originate in separate federated CDBMSs. Based on federation metadata and redo metadata that describe various PDBs and various foreign federated CDBMSs, all stored in same root dictionary 350 in same or different pseudo control files as explained above: a) both network connections are established, and b) both foreign redo data 331 and 332C are obtained.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
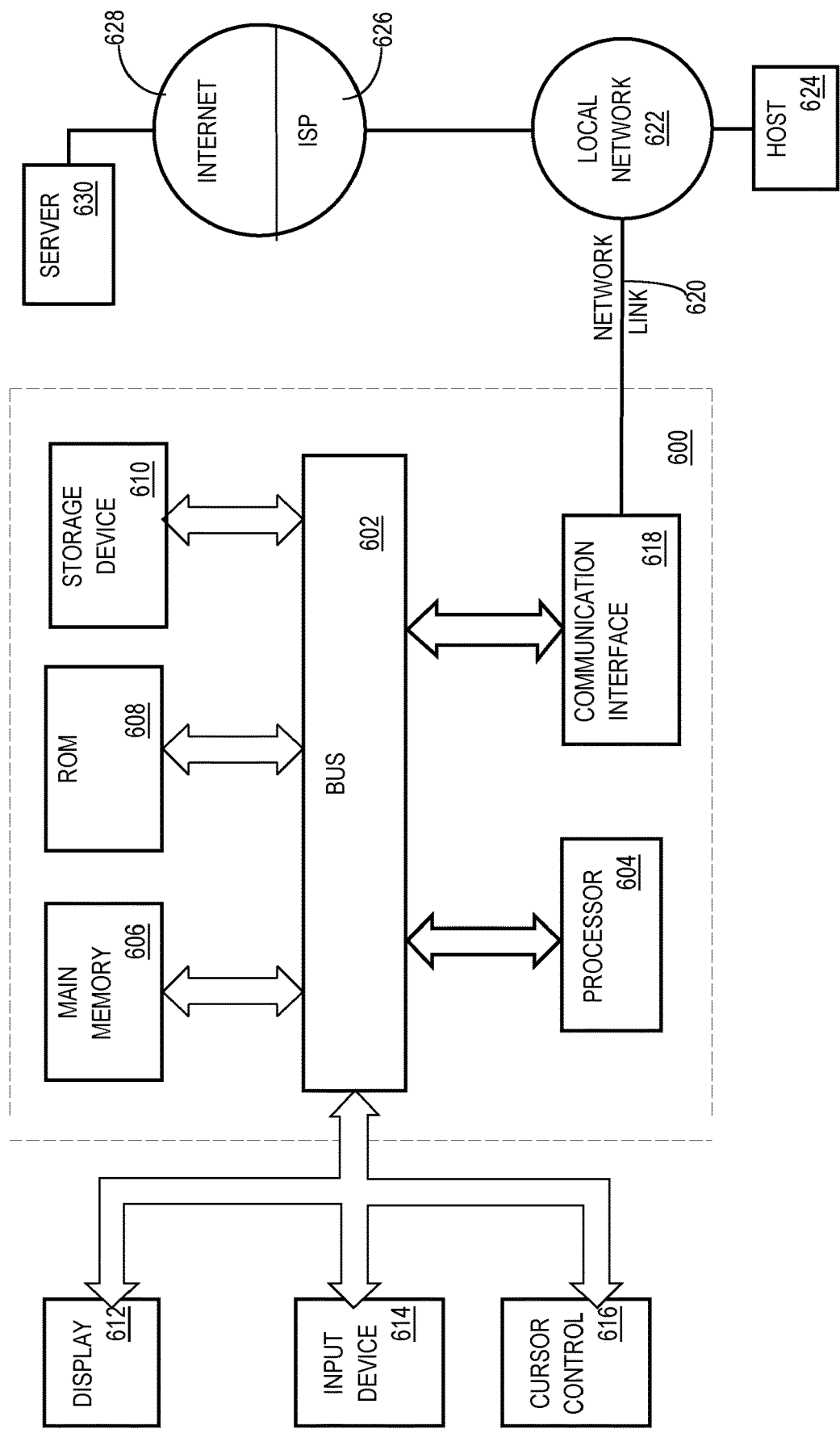
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
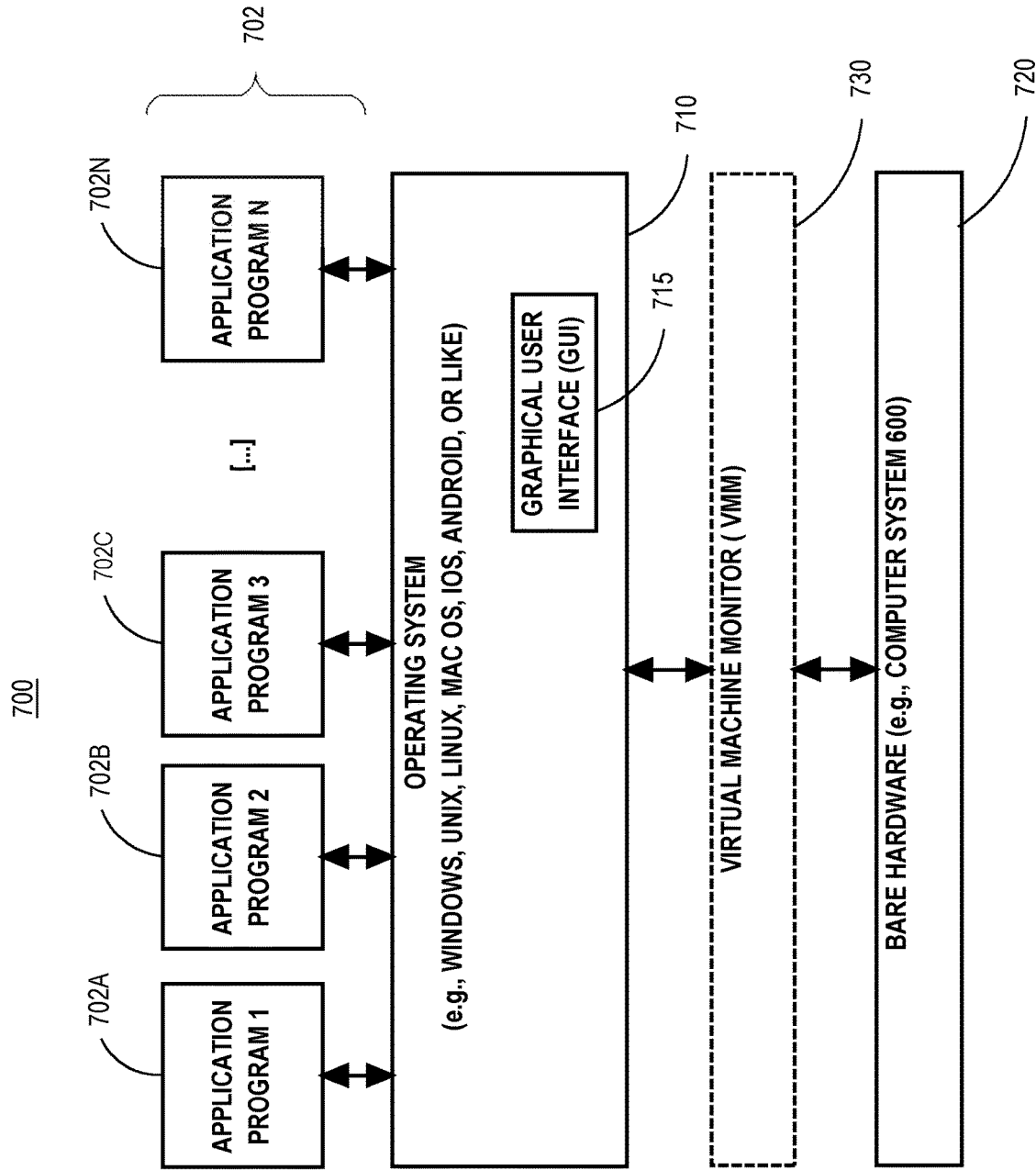
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 700 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

Database Dictionary

A database comprises data and a database dictionary that is stored on a persistent memory mechanism, such as a set of hard disks. A database is defined by its own separate database dictionary. A database dictionary may comprise multiple data structures that store database metadata. A database dictionary may for example, comprise multiple files and tables. Portions of the data structures may be cached in main memory of a database server.

A database dictionary comprises metadata that defines database objects contained in a database. In effect, a database dictionary defines much of a database. When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return datatype and the datatypes of the arguments, and may include source code and a compiled version thereof.

Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Database Operation

A database dictionary is referred to by a DBMS to determine how to execute database commands submitted to a DBMS. Database commands can access the database objects that are defined by the dictionary. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, from a first container database that contains a primary instance of a first pluggable database and a primary instance of a second pluggable database, redo data of the first pluggable database;
applying the redo data of the first pluggable database to a standby instance of the first pluggable database in a second container database that contains a standby instance of the second pluggable database; and
switching over to the standby instance of the second pluggable database without switching over the first pluggable database.

2. The method of claim 1 further comprising after said switching over, the first container database sending second redo data of the first pluggable database to the second container database.

3. The method of claim 1 wherein the first pluggable database and the second pluggable database are in service during said switching over the second pluggable database.

4. The method of claim 1 wherein:
said receiving uses a network connection between the first container database and the second container database;
the method further comprises receiving, using the network connection, redo data of the second pluggable database.

5. The method of claim 1 wherein:
the first pluggable database has only one primary instance;
the first pluggable database has a plurality of standby instances;
each standby instance of the plurality of standby instances is in a respective distinct container database.

6. The method of claim 1 further comprising the first container database concurrently receiving redo data from multiple other container databases.

7. The method of claim 1 further comprising accessing, based on a database dictionary, the redo data of the first pluggable database or redo data of the second pluggable database.

8. The method of claim 1 wherein the primary instance of the first pluggable database and the standby instance of the first pluggable database do not share persistent storage.

9. A method comprising:
identifying, in a metadata dictionary in a second container database, a primary instance of a first pluggable database;
establishing, based on said identifying in the metadata dictionary in the second container database, a network connection for a standby instance of the first pluggable database to receive redo data from the primary instance of the first pluggable database;
operating, in a first container database, the primary instance of the first pluggable database and a standby instance of a second pluggable database; and
operating, in the second container database, the standby instance of the first pluggable database and a primary instance of the second pluggable database, wherein said operating the standby instance of the first pluggable database is based on said establishing the network connection.

10. The method of claim 9 further comprising exchanging, on a single network connection between the first container database and the second container database, redo data of the first pluggable database and the second pluggable database.

11. The method of claim 9 further comprising concurrently: receiving, using a communication network that contains the network connection, redo data of the first pluggable database, and receiving, using the communication network, redo data of the second pluggable database.

12. One or more non-transitory computer-readable media storing instructions that, when executed by one or more processors, cause:
identifying, in a metadata dictionary in a second container database, a primary instance of a first pluggable database;
establishing, based on said identifying in the metadata dictionary in the second container database, a network connection for a standby instance of the first pluggable database to receive redo data from the primary instance of the first pluggable database;
operating, in a first container database, the primary instance of the first pluggable database and a standby instance of a second pluggable database; and
operating, in the second container database, the standby instance of the first pluggable database and a primary instance of the second pluggable database, wherein said operating the standby instance of the first pluggable database is based on said establishing the network connection.

13. The one or more non-transitory computer-readable media of claim 12 wherein the instructions further cause exchanging, on a single network connection between the first container database and the second container database, redo data of the first pluggable database and the second pluggable database.

14. The one or more non-transitory computer-readable media of claim 12 wherein
the instructions further cause concurrently:
receiving, using a communication network, redo data of the first pluggable database, and
receiving, using the communication network, redo data of the second pluggable database.

15. One or more non-transitory computer-readable media storing instructions that, when executed by one or more processors, cause:
receiving, from a first container database that contains a primary instance of a first pluggable database and a primary instance of a second pluggable database, redo data of the first pluggable database;
applying the redo data of the first pluggable database to a standby instance of the first pluggable database in a second container database that contains a standby instance of the second pluggable database; and
switching over to the standby instance of the second pluggable database without switching over the first pluggable database.

16. The one or more non-transitory computer-readable media of claim 15 wherein the instructions further cause after said switching over, the first container database sending second redo data of the first pluggable database to the second container database.

17. The one or more non-transitory computer-readable media of claim 15 wherein the first pluggable database and the second pluggable database are in service during said switching over the second pluggable database.

18. The one or more non-transitory computer-readable media of claim 15 wherein:
said receiving uses a network connection between the first container database and the second container database;
the instructions further cause receiving, using the network connection, redo data of the second pluggable database.

19. The one or more non-transitory computer-readable media of claim 15 wherein:
the first pluggable database has only one primary instance;
the first pluggable database has a plurality of standby instances;
each standby instance of the plurality of standby instances is in a respective distinct container database.

20. The one or more non-transitory computer-readable media of claim 15 wherein the instructions further cause the first container database concurrently receiving redo data from multiple other container databases.

* * * * *

UNITED STATES PATENT AND TRADEMARK OFFICE
CERTIFICATE OF CORRECTION

PATENT NO. : 12,353,434 B2
APPLICATION NO. : 18/438154
DATED : July 8, 2025
INVENTOR(S) : Li et al.

Page 1 of 1

It is certified that error appears in the above-identified patent and that said Letters Patent is hereby corrected as shown below:

In the Specification

In Column 2, Line 56, delete "(QOS)" and insert -- (QoS) --, therefor.

In Column 3, Lines 58-59, delete "spontancity" and insert -- spontaneity --, therefor.

In Column 3, Line 67, delete "a the" and insert -- the --, therefor.

In Column 7, Line 9, delete "(QOS)." and insert -- (QoS). --, therefor.

In Column 10, Line 26, delete "clastic" and insert -- elastic --, therefor.

In Column 11, Line 53, delete "CDMS" and insert -- CDBMS --, therefor.

Signed and Sealed this
Fourteenth Day of October, 2025

John A. Squires
*Director of the United States Patent and Trademark Office*